United States Patent [19]
Andrews

[11] 3,853,527
[45] Dec. 10, 1974

[54] PARTICLE COLLECTING APPARATUS

[75] Inventor: John Stanley Andrews, Barry, England

[73] Assignee: H. H. Robertson Company, Pittsburgh, Pa.

[22] Filed: Aug. 22, 1972

[21] Appl. No.: 282,724

[52] U.S. Cl.................. 55/403, 55/405, 55/457
[51] Int. Cl............................................. B01d 45/00
[58] Field of Search ............ 55/400, 401, 402, 403, 55/404, 405, 406, 407, 433, 456, 447, 413, 331, 336, 462, 414, 463, 434, 457

[56] References Cited
UNITED STATES PATENTS

| | | | |
|---|---|---|---|
| 3,273,324 | 9/1966 | Jennings | 55/404 |
| 3,282,032 | 11/1966 | King, Jr. et al. | 55/404 |
| 3,406,498 | 10/1968 | Wisting | 55/404 |
| 3,444,672 | 5/1969 | Alsobrooks | 55/403 |

Primary Examiner—Frank W. Lutter
Assistant Examiner—David L. Lacey
Attorney, Agent, or Firm—Harry B. Keck; George E. Manias

[57] ABSTRACT

A gas-laden stream is freed of its particulate material in an apparatus which includes a casing with an inlet opening, an outlet opening and at least one grouping of vanes which create a swirl in the gas stream passing through the grouping and at least one impeller which is rotatable under the impetus of the gas stream and creates a radial component of force in the gas stream tending to move the particles radially into engagement with the inner walls of the casing whence they gravitate to the base of the casing for elimination. A frusto-conical baffle member is provided adjacent to the outlet opening to create turbulence which aids in particle removal.

4 Claims, 3 Drawing Figures

PARTICLE COLLECTING APPARATUS

BACKGROUND OF THE INVENTION

1. Field of the Invention

The invention concerns improvements in particle collecting apparatus, more particularly in apparatus for eliminating particles of dust and/or moisture from solids-laden gas streams.

2. Description of the Prior Art

Devices are known for removing solids from a gas stream by impingement, by centrifugal action, by cyclonic action, by inertial action, and by filtering.

SUMMARY OF THE INVENTION

Some spray or mist producing apparatus generates water droplets, each of which has a particle of dust as its nucleus. The apparatus according to the present invention is designed to arrest and eliminate the airborne water droplets and dust particles, in the air stream, downstream from the spray or mist producing apparatus. The apparatus eliminates the droplets and the water borne dust, leaving the discharging air stream saturated with moisture but relatively dust free.

One object of the present invention is to provide such apparatus, which is compact and at the same time has a relatively low resistance to air flow. These are desirable features where, for example, the apparatus is to be used in confined spaces such as underground mines.

According to the present invention there is provided a gas collecting or like cleaning apparatus comprising a casing having an inlet opening and an outlet opening for directing a gas/water/dust stream through said casing, at least one vaned device which is a grouping of annularly disposed vanes, within the casing for imparting a swirl to the gas stream as it moves through the casing whereby the gas stream is subjected to centrifugal forces and the particles move toward the wall of the casing, at least one rotating impeller disposed within the casing to increase the radial velocity component acting on the gas stream, and a sump, outlet or the like to receive particles gravitating from the wall of the casing.

In one preferred embodiment of the invention there is in sequence a first radial vaned device followed by a first freely rotating impeller and a second radial vaned device which in turn is followed by a second freely rotating impeller. There may be more than two vaned devices and impellers arranged in this way so that the gas stream is dealt with by each in turn.

BRIEF DESCRIPTION OF THE DRAWING(S)

DESCRIPTION OF THE PREFERRED EMBODIMENT(S)

Figure 1:
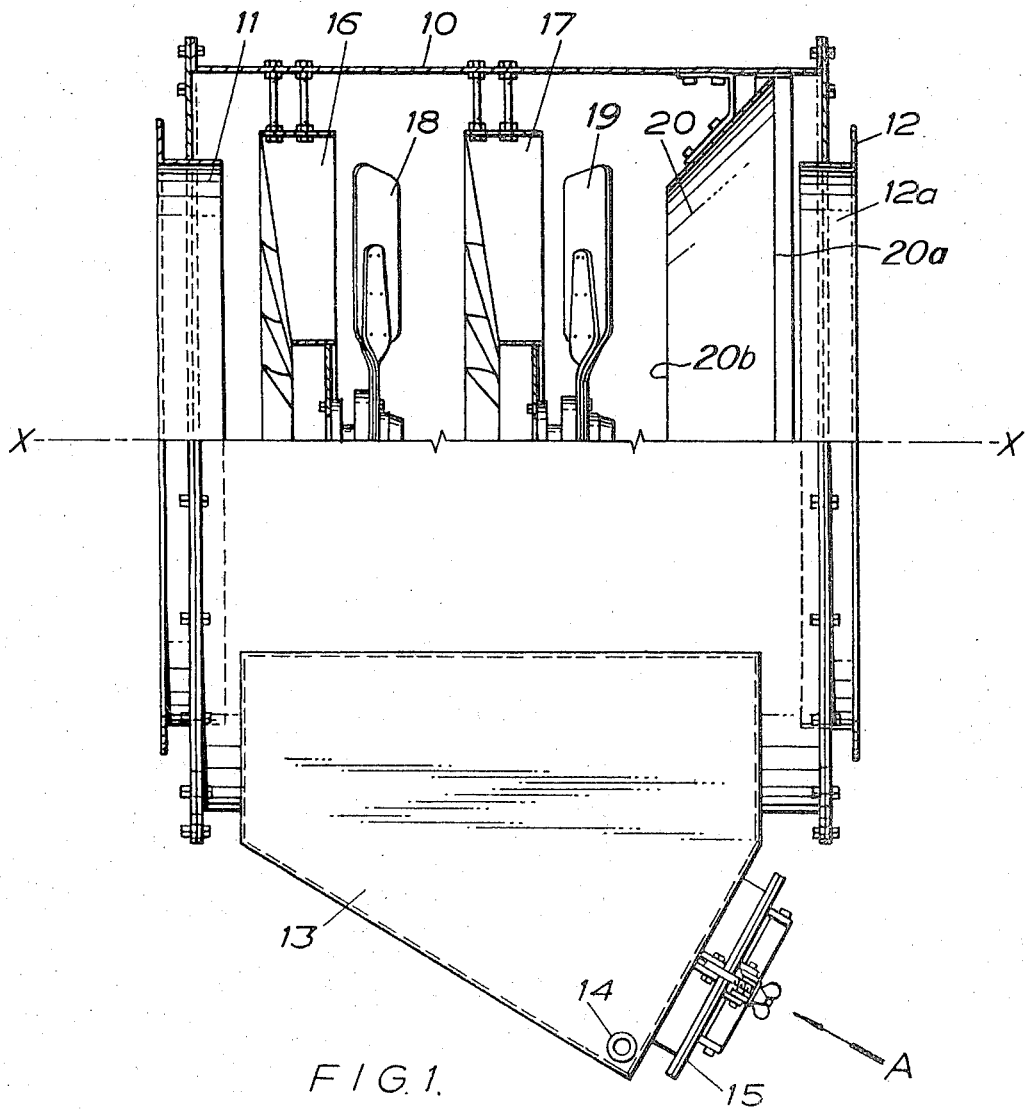
FIG. 1 is a side view of the apparatus partly in section on the centre line.
Figure 2:
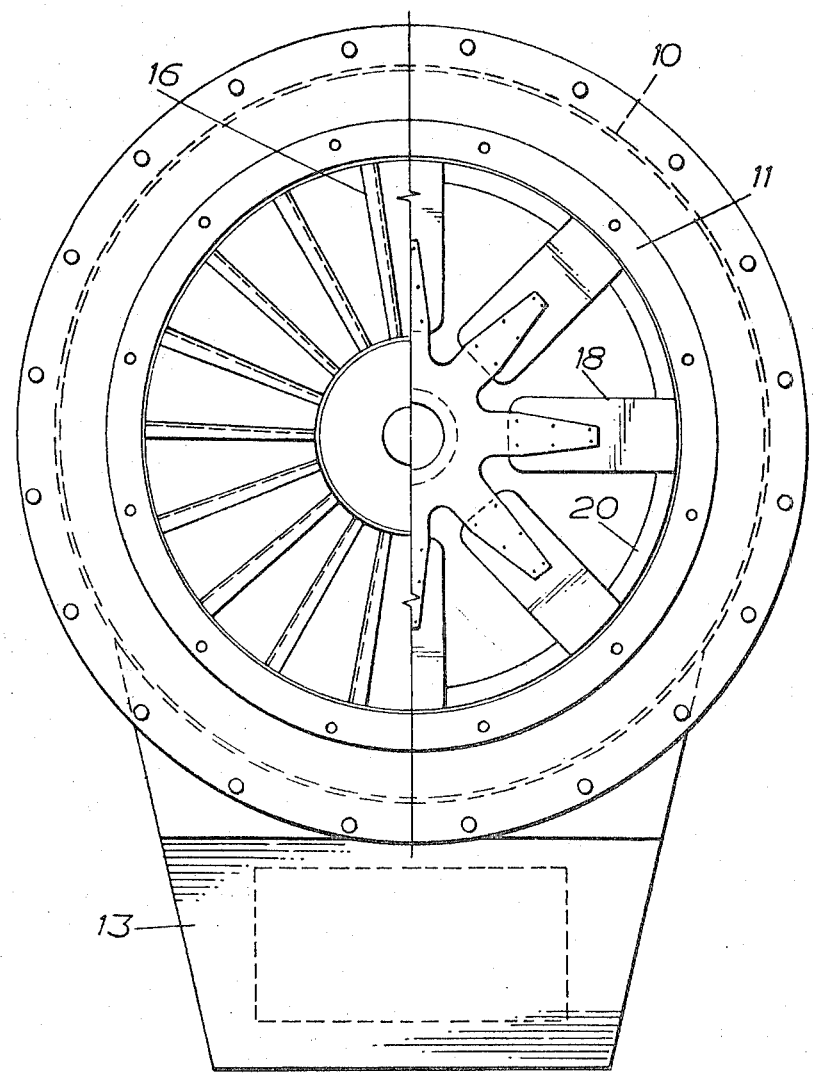
FIG. 2 is an end view of the apparatus.
Figure 3:
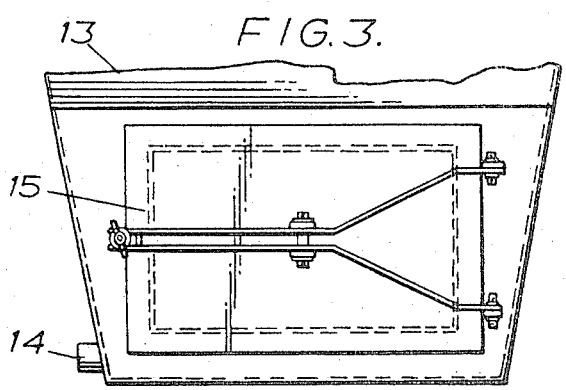
FIG. 3 is a fragmentary view in the direction of the arrow A of FIG. 1.

The apparatus comprises a generally cylindrical casing 10 having flanged inlet and outlet openings 11 and 12, respectively, to facilitate its connection in duct work in an axial attitude. A longitudinal axis X—X extends through the inlet opening 11 and the outlet opening 12.

A collecting sump 13 is provided at the lower part of the casing, said sump having a drain 14 and an inspection/cleaning hatch 15.

Arranged inside the cylindrical casing 10 are two radial vaned eliminator sections or devices 16 and 17 respectively, annularly disposed about the longitudinal axis X—X, each followed by a freely rotatable axial impeller 18 and 19 respectively. The pitch or twist of the radial vanes of the device 16 is opposite to that of the radial vanes of the device 17, as illustrated in FIG. 1, whereby the gas stream is made to swirl in opposite directions, as it flows through the devices 16 and 17. The blades of the impellers 18, 19 are oppositely angled relative to the longitudinal axis X—X, whereby the impellers 18 and 19 rotate in opposite directions under the action of the gas stream flowing through the casing.

A frustoconical expansion or baffle device 20 extends inwardly from the casing 10 and is positioned a short distance before the flanged outlet opening 12. The baffle device 20 presents a major opening 20a adjacent to the outlet opening 12, and a minor opening 20b between the major opening 20a and the impeller 19. The major and minor openings 20a, 20b have cross-sectional areas which are, respectively, greater than and less than the cross-sectional area of the outlet opening 12.

The particle-laden gas stream enters the collector apparatus through the inlet opening 11 where it meets the first radial vaned eliminator section 16. This imparts swirl to the gas stream whereby particles are subjected to centrifugal forces and move toward the inner wall of the casing. The swirling gas stream then encounters the first freely rotatable impeller 18 which is designed to increase the radial velocity component acting on the gas stream. Many of the particles are thereby deposited on the inside face of the cylindrical casing where they gravitate to the sump 13.

Following the first impeller stage the second radial vaned eliminator 17 either reintroduces swirl in or amplifies the swirl of the gas stream depending on whether the gas stream swirl has been negatived or reversed by flow through the first impeller 18. The gas stream then meets the second freely rotating impeller 19 which, as stated, rotates in a contra-direction to the first impeller 18. Due to the action of the second impeller some remaining particles are deposited on the wall of the casing and then flow to the sump 13.

Finally the frustoconical baffle 20 allows expansion of the gas stream and provides a surface area which is wetted by the remaining water in the gas stream for additional particle accumulation. The expansion of the gas stream provided by the frustoconical baffle 20 generates turbulence which assists in separating some remaining particles from the gas stream. A rearwardly directed cylindrical portion 12a of the outlet opening 12 provides a surface which is wetted by the remaining water in the gas stream for the purpose of separating some remaining particles from the gas stream.

The gas stream is discharged through the outlet opening 12 with a low or zero radial velocity component.

From the sump 13 the separated particles, usually as a slurry, are withdrawn to waste or to a settling tank.

I claim:

1. Apparatus for separating particulate matter from a moving gas stream including a casing having an inlet opening and an outlet opening; the said casing having a longitudinal axis passing through the said inlet opening and said outlet opening; a grouping of fixed radial vanes disposed about the said axis and between the said inlet opening and the said outlet opening, said vanes being arranged to impart a swirl to the said gas stream in a given direction as it passes through the said casing; an impeller which is freely rotatable about the said axis and located between the said grouping and the said outlet opening, said impeller having blades arranged to be rotated by the said moving gas stream in the direction of the swirl imparted to said gas stream by the vanes of the said grouping, and thereby to impart a radial velocity component to the said gas stream; means in the bottom of said casing for collecting particulate matter which is removed from the said gas stream; and a second grouping of fixed radial vanes disposed about the said axis and between the first said impeller and the said outlet opening, the vanes of the said second grouping being arranged to impart a swirl to the said gas stream in a direction opposite to that imparted by the vanes of the first said grouping.

2. The apparatus of claim 1 wherein a frustoconical wall extends inwardly from said casing and is positioned between the said impeller and the said outlet opening, the said frustoconical wall having a major opening adjacent to the said outlet opening and a minor opening between the said major opening and the said impeller, the said major opening having a cross-sectional area greater than the cross-sectional area of the said outlet opening, the minor opening having a cross-sectional area which is less than the said outlet opening.

3. The apparatus of claim 1 wherein a second impeller, freely rotatable about the said axis, is disposed between the said second grouping and the said outlet opening, the said second impeller having blades arranged to be rotated by the said moving gas stream in the direction of the swirl imparted to the said gas stream by the vanes of said second grouping, and thereby to impart a radial velocity component to the said gas stream.

4. The apparatus of claim 3 wherein a frustoconical wall extends inwardly from said casing and is positioned between the said second impeller and the said outlet opening, the said frustoconical wall having a major opening adjacent to the said outlet opening and a minor opening between the said major opening and the said second impeller, the said major opening having a cross-sectional area greater than the cross-sectional area of the said outlet opening, the minor opening having a cross-sectional area which is less than the said outlet opening.

* * * * *